(12) United States Patent
Ju et al.

(10) Patent No.: US 12,547,335 B2
(45) Date of Patent: Feb. 10, 2026

(54) DATA MIGRATION METHOD, ELECTRONIC DEVICE, AND STORAGE MEDIUM

(71) Applicant: Beijing Volcano Engine Technology Co., Ltd., Beijing (CN)

(72) Inventors: Kejian Ju, Beijing (CN); Leilei Hu, Beijing (CN); Yuanpu Ding, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/962,808

(22) Filed: Nov. 27, 2024

(65) Prior Publication Data

US 2025/0224897 A1 Jul. 10, 2025

(30) Foreign Application Priority Data

Jan. 8, 2024 (CN) .......................... 202410028938.8

(51) Int. Cl.
*G06F 7/00* (2006.01)
*G06F 3/06* (2006.01)
*G06F 16/21* (2019.01)
*G06F 16/23* (2019.01)
*G06F 17/00* (2019.01)

(52) U.S. Cl.
CPC .......... *G06F 3/0647* (2013.01); *G06F 3/0604* (2013.01); *G06F 3/067* (2013.01); *G06F 16/214* (2019.01); *G06F 16/2336* (2019.01)

(58) Field of Classification Search
USPC .............................................. 707/610–704
See application file for complete search history.

(56) References Cited

U.S. PATENT DOCUMENTS

| | | | | |
|---|---|---|---|---|
| 2013/0132674 | A1* | 5/2013 | Sundrani | G06F 12/0804 711/E12.039 |
| 2015/0363455 | A1* | 12/2015 | Bhattacharjee | G06F 9/466 707/704 |
| 2017/0255391 | A1* | 9/2017 | Iwata | G06F 3/0685 |
| 2018/0150485 | A1* | 5/2018 | Tripathy | G06F 16/1748 |
| 2021/0081403 | A1* | 3/2021 | Tian | G06F 16/2365 |
| 2021/0349863 | A1* | 11/2021 | Dani | G06F 16/2343 |

FOREIGN PATENT DOCUMENTS

| | | |
|---|---|---|
| CN | 110008199 A | 7/2019 |
| CN | 110858124 A | 3/2020 |

\* cited by examiner

*Primary Examiner* — Tuan A Pham
(74) *Attorney, Agent, or Firm* — Alleman Hall LLP

(57) ABSTRACT

A data migration method, electronic device, and storage medium are provided. The method includes: obtaining a hot and cold state of a data table to be processed; in response to the hot and cold state indicating that the data in the data table to be processed is cold data, determining whether the data table to be processed is associated with a data lock, where the data table to be processed being associated with the data lock indicates that a data query task that needs to query the data table to be processed exists, and the data table to be processed not being associated with the data lock indicates that the data query task does not exist; and in response to the data table to be processed being associated with the data lock, performing a migration operation on the data table to be processed after the data lock is released.

13 Claims, 3 Drawing Sheets

DATA MIGRATION METHOD, ELECTRONIC DEVICE, AND STORAGE MEDIUM

CROSS-REFERENCE TO RELATED APPLICATION

The present application claims priority of the Chinese Patent Application No. 202410028938.8, filed on Jan. 8, 2024, the disclosure of which is incorporated herein by reference in its entirety as part of the present application.

TECHNICAL FIELD

The present disclosure relates to the field of computer technologies, and in particular, to a data migration method and apparatus.

BACKGROUND

With the development of computer technologies, more and more data appears, and accordingly, more and more data storage technologies appear. A data storage system includes but is not limited to a local file system, a Hadoop distributed file system (HDFS), an object storage system, a cache system, and the like.

In some scenarios, data is not fixedly stored in a specific location but may be migrated. For example, the data is migrated to another data storage system. For another example, the data is migrated to another storage location in a current data storage system.

Currently, when data is migrated, the performance of the data storage system is reduced. Therefore, a solution is urgently needed to solve the foregoing problem.

SUMMARY

To solve or at least partially solve the foregoing technical problem, the embodiments of the present disclosure provide a data migration method and apparatus.

An embodiment of the present disclosure provides a data migration method. The method includes:

obtaining a hot and cold state of a data table to be processed, where the hot and cold state of the data table to be processed indicates that data in the data table to be processed is cold data or hot data;

in response to the hot and cold state indicating that the data in the data table to be processed is cold data, determining whether the data table to be processed is associated with a data lock, where the data table to be processed being associated with the data lock indicates that a data query task that needs to query the data table to be processed exists, and the data table to be processed not being associated with the data lock indicates that the data query task that needs to query the data table to be processed does not exist; and in response to the data table to be processed being associated with the data lock, performing a migration operation on the data table to be processed after the data lock is released, where the data lock being released indicates that the execution of the data query task that needs to query the data table to be processed is completed.

Optionally, the data table to be processed being associated with the data lock, and comprises: the data table to be processed being locked entirely;

and accordingly, performing the migration operation on the data table to be processed after the data lock is released comprises:
performing the migration operation on all data included in the data table to be processed after the data lock is released.

Optionally, the data table to be processed being associated with the data lock, comprises: a first partition in the data table to be processed being locked, where the data table to be processed comprises at least one partition, the at least one partition comprises the first partition, and the first partition is a partition that needs to be queried by the data query task;

and accordingly, performing the migration operation on the data table to be processed after the data lock is released comprises:
performing the migration operation on data included in the first partition after the data lock is released.

Optionally, the at least one partition further comprises a second partition, the second partition is a partition that does not need to be queried by the data query task, and the method further comprises:
in response to the first partition being locked, immediately performing the migration operation on data included in the second partition.

Optionally, the obtaining a hot and cold state of a data table to be processed comprises:
obtaining a historical query parameter of the data table to be processed, where the historical query parameter comprises a historical query frequency and/or a historical query time;
and determining the hot and cold state based on the historical query parameter.

Optionally, the obtaining a hot and cold state of a data table to be processed comprises:
determining the hot and cold state of the data table to be processed based on a heat cycle of the data table to be processed, where the heat cycle indicates a duration for which data in the data table to be processed is hot data.

Optionally, the method further comprises:
in response to the data table to be processed not being associated with the data lock, immediately performing the migration operation on the data table to be processed.

Optionally, the data table to be processed comprises:
a data table in a data warehouse analysis system that is constructed based on distributed computing.

An embodiment of the present disclosure provides a data migration apparatus. The apparatus includes: an obtaining unit, a determining unit, and a first migration unit.

The obtaining unit is configured to obtain a hot and cold state of a data table to be processed, where the hot and cold state of the data table to be processed indicates that data in the data table to be processed is cold data or hot data;

The determining unit is configured to, in response to the hot and cold state indicating that the data in the data table to be processed is cold data, determine whether the data table to be processed is associated with a data lock, where the data table to be processed being associated with the data lock indicates that a data query task that needs to query the data table to be processed exists, and the data table to be processed not being associated with the data lock indicates that the data query task that needs to query the data table to be processed does not exist.

The first migration unit is configured to, in response to the data table to be processed being associated with the data lock, perform a migration operation on the data table to be processed after the data lock is released, where the data lock being released indicates that the execution of the data query task that needs to query the data table to be processed is completed.

Optionally, the data table to be processed being associated with the data lock, comprises: the data table to be processed being locked entirely;

and accordingly, the first migration unit is configured to:
perform the migration operation on all data included in the data table to be processed after the data lock is released.

Optionally, the data table to be processed being associated with the data lock, comprises: a first partition in the data table to be processed being locked, where the data table to be processed comprises at least one partition, the at least one partition comprises the first partition, and the first partition is a partition that needs to be queried by the data query task;

and accordingly, the first migration unit is configured to:
perform the migration operation on data included in the first partition after the data lock is released.

Optionally, the at least one partition further comprises a second partition, the second partition is a partition that does not need to be queried by the data query task, and the apparatus further comprises a second migration unit.

The second migration unit is configured to, in response to the first partition being locked, immediately perform the migration operation on data included in the second partition.

Optionally, the obtaining unit is configured to:
obtain a historical query parameter of the data table to be processed, where the historical query parameter comprises a historical query frequency and/or a historical query time; and
determine the hot and cold state based on the historical query parameter.

Optionally, the obtaining unit is configured to:
determine the hot and cold state of the data table to be processed based on a heat cycle of the data table to be processed, where the heat cycle indicates a duration for which data in the data table to be processed is hot data.

Optionally, the apparatus further comprises: a third migration unit.

The third migration unit is configured to, in response to the data table to be processed not being associated with the data lock, immediately perform the migration operation on the data table to be processed.

Optionally, the data table to be processed comprises:
a data table in a data warehouse analysis system that is constructed based on distributed computing.

An embodiment of the present disclosure provides an electronic device. The device includes a processor and a memory.

The processor is configured to execute instructions stored in the memory, to cause the device to perform the data migration method.

An embodiment of the present disclosure provides a computer-readable storage medium comprising instructions. The instructions instruct a device to perform the data migration method.

An embodiment of the present disclosure provides a computer program product which, when executed on a computer, causes the computer to perform the data migration method.

BRIEF DESCRIPTION OF DRAWINGS

To make the objectives, technical solutions, and advantages of the embodiments of the present disclosure clearer, the following briefly describes the accompanying drawings used in the description of the embodiments or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION

To make the objectives, technical solutions, and advantages of the embodiments of the present disclosure clearer, the following describes the technical solutions in the embodiments of the present disclosure clearly and completely with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The inventors of the present disclosure have found through research that currently, when a data storage system performs data migration, the data migration is generally performed in granularity of a directory in a file system. When the data migration is performed in granularity of the directory, in the case where a data query task that needs to query a data table corresponding to the directory exists, since the data corresponding to the directory has been partially or completely migrated, the data query task may fail to be executed, thereby reducing the query performance of the data storage system.

Moreover, when the data migration is performed in granularity of the directory in the file system, the specific content corresponding to the directory is not perceived (that is, it is not perceived which data table the directory specifically corresponds to). However, during the data query, the query is generally performed on a data table. Therefore, with the current migration solution, it cannot be determined whether the data table that needs to be queried by a data query task is a data table corresponding to the directory to be migrated. Correspondingly, the corresponding measure cannot be performed to ensure that the data query task is successfully executed.

To solve the foregoing problems, the embodiments of the present disclosure provide a data migration method and apparatus.

Various non-limiting implementations of the present disclosure are described in detail below with reference to the accompanying drawings.

Exemplary Method

Figure 1:
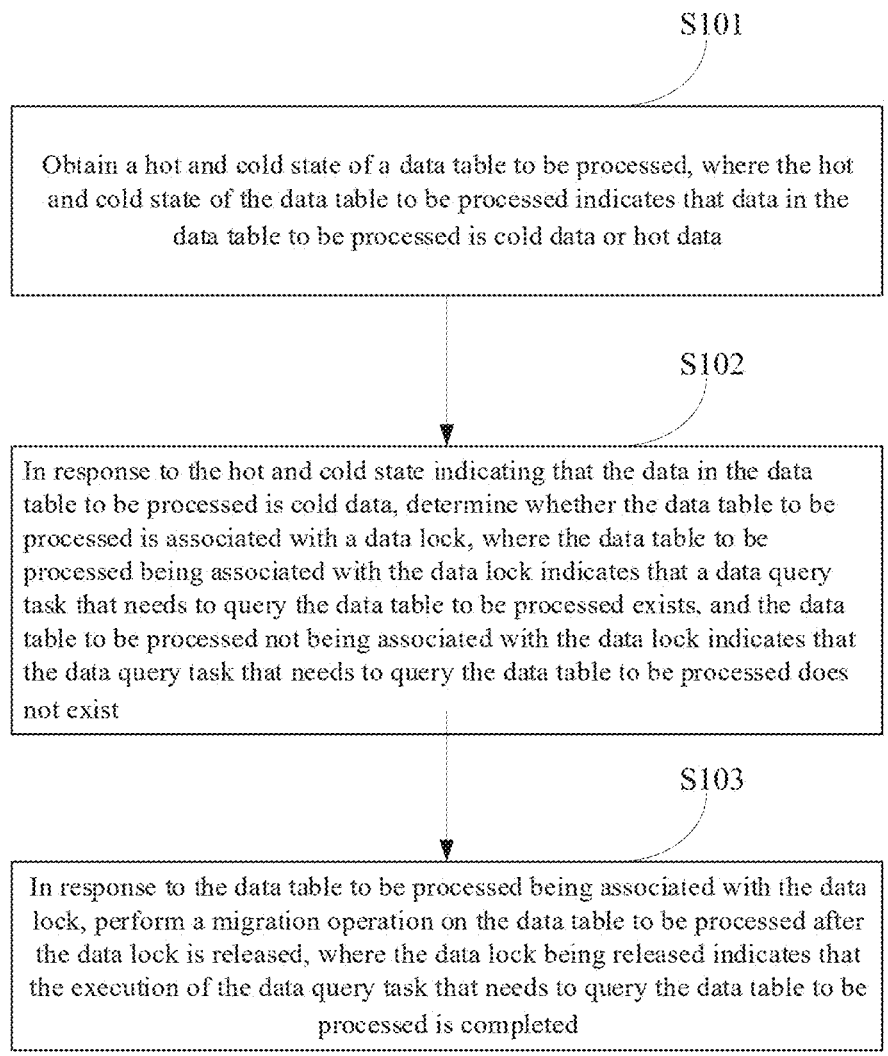
FIG. 1 is a schematic flowchart of a data migration method according to an embodiment of the present disclosure.

FIG. 1 is a schematic flowchart of a data migration method according to an embodiment of the present disclosure. In this embodiment, the method may be applied to a data storage system. In the following example, the method is applied to the first data storage system as an example for description.

For example, the method may include the following steps: S101 to S103.

S101: Obtain a hot and cold state of a data table to be processed, where the hot and cold state of the data table to be processed indicates that data in the data table to be processed is cold data or hot data.

In the embodiments of the present disclosure, the data table to be processed may be a data table stored in the first data storage system. In a specific example, the first data storage system may be a data warehouse analysis system hive constructed based on distributed computing. Correspondingly, the data table to be processed may be a hive table. Certainly, the first data storage system may alternatively be a data storage system constructed by using another storage technology. Correspondingly, the data table to be processed may alternatively be a data table in a data storage system constructed by using another storage technology. Details are not described herein one by one.

In the embodiments of the present disclosure, the hot and cold state of the data table to be processed is a hot and cold state indication in a data table dimension, and is used to indicate the hot and cold state of data in the entire data table to be processed. The hot and cold state of the data table to be processed may include two states: a hot state and a cold state. The hot state indicates that the data in the data table to be processed is hot data, and the cold state indicates that the data in the data table to be processed is cold data. The hot data may include data with a high frequency of use, data that is recently updated, or data with more accesses. The cold data may include data with a low frequency of use or data with fewer accesses.

In the embodiments of the present disclosure, there are a plurality of implementations of S101. The following describes two possible implementations.

In an implementation, the hot and cold state of the data table to be processed may be determined based on a historical query condition of the data table to be processed. Specifically, a historical query parameter of the data table to be processed may be obtained. The historical query parameter may include a parameter that can indicate a historical query heat of the data table to be processed, and the hot and cold state is determined based on the historical query parameter. In an example, considering that a historical query frequency and/or a historical query time may reflect the historical query heat of the data table to be processed, the historical query parameter may include the historical query frequency and the historical query time. The historical query frequency mentioned here may be a query frequency in a historical period of time (for example, a query frequency in the previous three natural days). The query time mentioned here may be a query time of the most recent N times, and N is a positive integer. For example, when N is equal to 1, the historical query time refers to a query time of the most recent query on the data table to be processed.

In an example, the historical query frequency and/or the historical query time of the data table to be processed may be obtained by using a hook function.

In an example, an operation log of the first data storage system may be analyzed, and log information for a query on the data table to be processed is extracted from the operation log, so that the historical query frequency and/or the historical query time of the data table to be processed are obtained based on the log information.

In an example, when the historical query parameter includes the historical query frequency, the hot and cold state of the data table to be processed may be determined as the cold state in the case where the historical query frequency is less than a preset frequency. That is, the hot and cold state of the data table to be processed indicates that the data in the data table to be processed is cold data. In contrast, when the historical query frequency is greater than or equal to the preset frequency, the hot and cold state of the data table to be processed may be determined as the hot state. That is, the hot and cold state of the data table to be processed indicates that the data in the data table to be processed is hot data.

The preset frequency is not specifically limited in the embodiments of the present disclosure, and the preset frequency may be set based on an actual situation.

In another example, when the historical query parameter includes the historical query time, in the case where a time difference between the query time of the most recent N times and a current time is greater than a preset duration, indicating that the data table to be processed has not been queried for a long time, and therefore, the hot and cold state of the data table to be processed may be determined as the cold state. That is, the hot and cold state of the data table to be processed indicates that the data in the data table to be processed is cold data. In contrast, when the time difference between the query time of the most recent N times and the current time is less than or equal to the preset duration, indicating that the data table to be processed has been queried recently, and it is still possible for the data table to be processed to be queried currently or in the future. Therefore, the hot and cold state of the data table to be processed may be determined as the hot state. That is, the hot and cold state of the data table to be processed indicates that the data in the data table to be processed is hot data.

The preset duration is not specifically limited in the embodiments of the present disclosure, and the preset duration may be set based on an actual situation.

In another example, the hot and cold state of the data table to be processed may be determined based on a heat cycle of the data table to be processed, where the heat cycle indicates a duration for which data in the data table to be processed is hot data. Specifically, timing is started when the data table to be processed is stored in the foregoing first storage system. When the timing does not reach the heat cycle, the hot and cold state of the data table to be processed is the hot state. When the timing reaches the heat cycle, the hot and cold state of the data table to be processed is the cold state. The heat cycle of the data table to be processed may be preconfigured. For example, the heat cycle of the data table to be processed may be configured by using a configuration file. Correspondingly, the first data storage system may read the heat cycle of the data table to be processed from the configuration file, and further the hot and cold state of the data table to be processed is determined based on the heat cycle of the data table to be processed.

The heat cycle of the data table to be processed is not specifically limited in the embodiments of the present disclosure. The heat cycle may be set based on an actual situation. For example, the heat cycle may be three days.

As mentioned above, the data table to be processed may be a hive table. Currently, hive has a time to live (TTL) management mechanism. Specifically, when a TTL of the hive table arrives, the hive table is deleted. As a hive table (data table to be processed) that is not deleted, a heat cycle may be set for the hive table in this solution. In combination with an existing TTL management mechanism of hive, full lifecycle management of the hive table can be implemented.

S102: In response to the hot and cold state indicating that the data in the data table to be processed is cold data, determine whether the data table to be processed is associated with a data lock, where the data table to be processed being associated with the data lock indicates that a data query task that needs to query the data table to be processed exists, and the data table to be processed not being associated with the data lock indicates that the data query task that needs to query the data table to be processed does not exist.

Facing the increasingly expanded data storage, from the perspectives of cost and performance, hot data may be stored on the storage with higher performance, and cold data is preferably placed on an archive file system, so that both cost and performance can reach a balance.

In the embodiments of the present disclosure, when the hot and cold state of the data table to be processed indicates that the data in the data table to be processed is cold data, a migration operation may be performed on the data table to be processed to migrate the data in the data table to be processed to the archive file system.

In the embodiments of the present disclosure, to avoid the failure of the execution of the data query task that needs to query the data table to be processed when a migration operation is performed on the data table to be processed, which results in reducing query performance of the first data storage system, after it is determined that the data in the data table to be processed is cold data, it may be further determined whether a data query task that needs to query the data table to be processed exists. Specifically, it may be determined whether the data table to be processed is associated with a data lock. Regarding the data lock, the following needs to be described:

When the data table to be processed is associated with the data lock, it is indicated that a data query task that needs to query the data table to be processed exists. When the data table to be processed is not associated with the data lock, it is indicated that the data query task that needs to query the data table to be processed does not exist. The data table to be processed being associated with the data lock may be in two cases. In the first case, the data lock is a lock at a data table granularity and corresponds to the entire data table to be processed. When the data table to be processed is associated with the data lock, it is indicated that the entire data table to be processed is locked. In the second case, the data lock is a lock at a partition granularity. The data table to be processed may include at least one partition, and the at least one partition includes a first partition that needs to be queried by the data query task. In this case, the data table to be processed being associated with the data lock may be: the first partition in the data table to be processed is locked.

In the embodiments of the present disclosure, the data lock may be added to the data table to be processed by the first data storage system.

In an example, in the case where the foregoing data lock is a lock at a data table granularity, when receiving a data query task, the first data storage system may determine the data table that needs to be queried by the data query task (for example, the determined data table is the foregoing data table to be processed), and lock the entire data table.

In another example, in the case where the foregoing data lock is a lock at a partition granularity, when receiving a data query task, the first data storage system may determine a data table that needs to be queried by the data query task (for example, the determined data table is the foregoing data table to be processed), and further determine the first partition in the data table to be processed that needs to be queried by the data query task, and lock the first partition.

S103: In response to the data table to be processed being associated with the data lock, perform a migration operation on the data table to be processed after the data lock is released, where the data lock being released indicates that the execution of the data query task that needs to query the data table to be processed is completed.

In an example, when the data table to be processed is associated with the data lock, to avoid the failure of the execution of data query task that needs to query the data table to be processed, the data table to be processed may not be immediately migrated, but is migrated after the execution of the data query task that needs to query the data table to be processed is completed. In a specific example, if the execution of the data query task that needs to query the data table to be processed is completed, the data lock is released. Therefore, the migration operation may be performed on the data table to be processed after the data lock is released.

As mentioned above, the foregoing data lock may be a lock at a data table granularity or a lock at a partition granularity. When the data lock is the lock at the data table granularity, the migration operation may be performed on all data included in the data table to be processed after the data lock is released. When the data lock is the lock at the partition granularity, the migration operation may be performed on data included in the first partition after the data lock is released.

In an example, when the data lock is the lock at the partition granularity, in addition to the first partition, the data table to be processed may further include a second partition, and the second partition is a partition that does not need to be queried by the foregoing data query task. In this case, to improve data migration efficiency as much as possible, the migration operation may be immediately performed on data in the second partition in the case that it is determined that the first partition is locked. In other words, when the data lock is the lock at the partition granularity, the data lock affects only a migration timing of data in the partition (the first partition) corresponding to the data lock (that is, the migration operation on the data in the first partition can be started only after the data lock is released). For the second partition in the data table to be processed, the migration timing thereof is not affected by the data lock, so that the data query task affects only the migration timing of the first partition that needs to be queried by the data query task, thereby ensuring migration efficiency of the data table to be processed.

It should be noted that "immediately performing the migration operation on data in the second partition" mentioned here does not mean that the migration operation is performed on the data in the second partition at a first moment after it is determined that the first partition is locked, but means that the migration operation may be performed on the data in the second partition without waiting for the data lock to be released. When the migration operation can be performed on the data in the second partition at the first moment, the migration operation may be performed on the data in the second partition at the first moment.

In another example, when the foregoing data table to be processed is not associated with the data lock, it is indicated that the data query task that needs to query the data table to be processed does not exist. In this case, migrating the data table to be processed does not affect the query performance of the first data storage system. Therefore, in this case, the migration operation may be immediately performed on the data table to be processed, to migrate the data table to be processed to the archive file system.

"Immediately performing the migration operation on the data table to be processed" mentioned here does not mean that the migration operation is performed on the data in the data table to be processed at a first moment after it is determined that the data table to be processed is not associated with the data lock, but means that the migration operation is performed on the data in the data table to be processed as soon as possible. In an example, when the migration operation can be performed on the data in the data table to be processed at the first moment, the migration operation may be performed on the data in the data table to be processed at the first moment.

It can be learned from the foregoing description that through the solution, when the data table to be processed is associated with the data lock, it is indicated that a data query task that needs to query the data table to be processed exists. In this case, the migration operation may not be immediately performed on the data table to be processed, but the migration operation is performed on the data table to be processed after the execution of the data query task is completed. Therefore, the data migration can be implemented without affecting query performance of a data storage system.

In an example, hive may be used as a computing engine, and the hive computing engine may form a big data interaction scenario with multiple computing engines and multiple storage levels with another engine and another data storage system. With the solution, a data storage cost and data query performance of the foregoing big data interaction scenario can be balanced.

Exemplary Apparatus

Based on the method provided in the foregoing embodiment, the embodiments of the present disclosure further provide an apparatus. The apparatus is described below with reference to the accompanying drawings.

Figure 2:
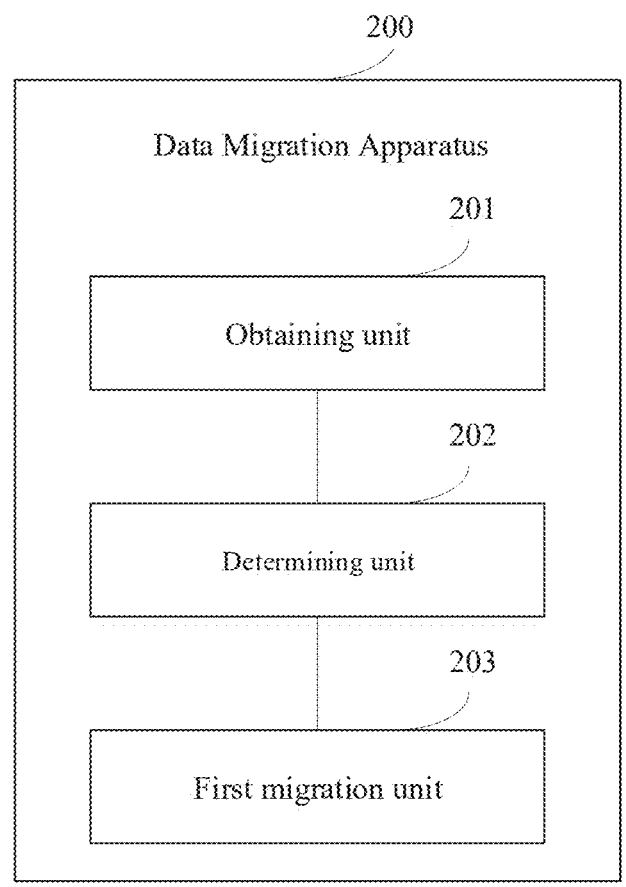
FIG. 2 is a schematic structural diagram of a data migration apparatus according to an embodiment of the present disclosure.

FIG. 2 is a schematic structural diagram of a data migration apparatus according to an embodiment of the present disclosure. The apparatus 200 may specifically include, for example, an obtaining unit 201, a determining unit 202, and a first migration unit 203.

The obtaining unit 201 is configured to obtain a hot and cold state of a data table to be processed, where the hot and cold state of the data table to be processed indicates that data in the data table to be processed is cold data or hot data;

the determining unit 202 is configured to, in response to the hot and cold state indicating that the data in the data table to be processed is cold data, determine whether the data table to be processed is associated with a data lock, where the data table to be processed being associated with the data lock indicates that a data query task that needs to query the data table to be processed exists, and the data table to be processed not being associated with the data lock indicates that the data query task that needs to query the data table to be processed does not exist; and the first migration unit 203 is configured to, in response to the data table to be processed being associated with the data lock, perform a migration operation on the data table to be processed after the data lock is released, where the data lock being released indicates that the execution of the data query task that needs to query the data table to be processed is completed.

Optionally, the data table to be processed is associated with the data lock, and comprises: the entire data table to be processed being locked;

and accordingly, the first migration unit 203 is configured to:

perform the migration operation on all data included in the data table to be processed after the data lock is released.

Optionally, the data table to be processed is associated with the data lock, and comprises: a first partition in the data table to be processed being locked, where the data table to be processed comprises at least one partition, the at least one partition comprises the first partition, and the first partition is a partition that needs to be queried by the data query task;

and accordingly, the first migration unit 203 is configured to:

perform the migration operation on data included in the first partition after the data lock is released.

Optionally, the at least one partition further comprises a second partition, the second partition is a partition that does not need to be queried by the data query task, and the apparatus further comprises:

a second migration unit, configured to, in response to the first partition being locked, immediately perform the migration operation on data included in the second partition.

Optionally, the obtaining unit 201 is configured to:

obtain a historical query parameter of the data table to be processed, where the historical query parameter comprises a historical query frequency and/or a historical query time; and determine the hot and cold state based on the historical query parameter.

Optionally, the obtaining unit 201 is configured to:

determine the hot and cold state of the data table to be processed based on a heat cycle of the data table to be processed, where the heat cycle indicates a duration for which data in the data table to be processed is hot data.

Optionally, the apparatus further comprises:

a third migration unit, configured to, in response to the data table to be processed not being associated with the data lock, immediately perform the migration operation on the data table to be processed.

Optionally, the data table to be processed comprises:

a data table in a data warehouse analysis system that is constructed based on distributed computing.

Because the apparatus 200 is an apparatus corresponding to the data migration method provided in the foregoing method embodiment, specific implementation of each unit of the apparatus 200 is the same as the foregoing method embodiment, and is a concept. Therefore, for specific implementation of each unit of the apparatus 200, reference may be made to a related description part of the foregoing method embodiment, and details are not described herein again.

An embodiment of the present disclosure further provides a device. The device includes a processor and a memory.

The processor is configured to execute instructions stored in the memory, to cause the device to perform the data migration method according to any one of the foregoing method embodiments.

Figure 3:
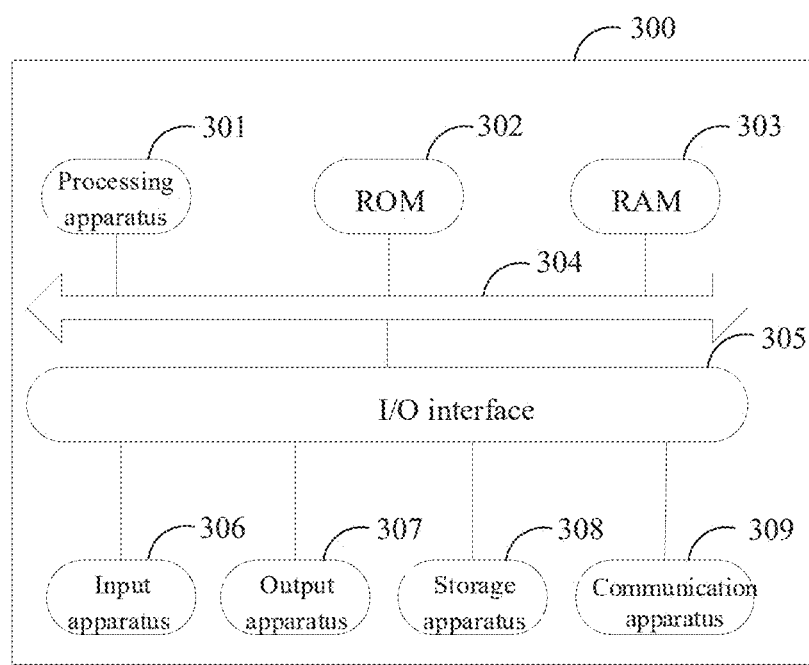
FIG. 3 is a schematic structural diagram of an electronic device according to an embodiment of the present disclosure.

Reference is made to FIG. 3 below, which is a schematic structural diagram of an electronic device 300 suitable for implementing an embodiment of the present disclosure. The electronic device in this embodiment of the present disclosure may include, but is not limited to, mobile terminals such as a mobile phone, a notebook computer, a digital broadcast receiver, a personal digital assistant (PDA), a portable android device (PAD), and a portable media player (PMP), and fixed terminals such as a digital TV (television) and a desktop computer. The electronic device shown in FIG. 3 is merely an example, and shall not impose any limitation on the function and scope of use of the embodiments of the present disclosure.

As shown in FIG. 3, the electronic device 300 may include a processing apparatus (for example, a central processing unit, a graphics processing unit, etc.) 301 that may perform a variety of appropriate actions and processing in accordance with a program stored in a read-only memory (ROM) 302 or a program loaded from a storage apparatus 308 into a random access memory (RAM) 303. The RAM 303 further stores various programs and data required for the operation of the electronic device 300. The processing apparatus 301, the ROM 302, and the RAM 303 are connected to each other through a bus 304. An input/output (I/O) interface 305 is also connected to the bus 304.

Generally, the following apparatuses may be connected to the I/O interface 305: an input apparatus 306 including, for example, a touchscreen, a touchpad, a keyboard, a mouse, a camera, a microphone, an accelerometer, and a gyroscope; an output apparatus 307 including, for example, a liquid crystal display (LCD), a speaker, and a vibrator; a storage apparatus 308 including, for example, a tape and a hard disk; and a communication apparatus 309. The communication apparatus 309 may allow the electronic device 300 to perform wireless or wired communication with other devices to exchange data. Although FIG. 3 shows the electronic device 300 having various apparatuses, it should be understood that it is not required to implement or have all of the shown apparatuses. It may be an alternative to implement or have more or fewer apparatuses.

In particular, according to an embodiment of the present disclosure, the process described above with reference to the flowcharts may be implemented as a computer software program. For example, this embodiment of the present disclosure includes a computer program product, which includes a computer program carried on a non-transitory computer-readable medium, where the computer program includes program code for performing the method shown in the flowchart. In such an embodiment, the computer program may be downloaded and installed from a network through the communication apparatus 309, or installed from the storage apparatus 308, or installed from the ROM 302. When the computer program is executed by the processing apparatus 301, the above-mentioned functions defined in the method of the embodiment of the present disclosure are executed.

The electronic device provided in the embodiment of the present disclosure and the method provided in the foregoing embodiment belong to the same inventive concept. For technical details that are not described in detail in this embodiment, reference may be made to the foregoing embodiment, and this embodiment and the foregoing embodiment have the same beneficial effects.

An embodiment of the present disclosure provides a computer-readable medium having a computer program stored thereon, where the program, when executed by a processor, implements the method according to any one of the foregoing embodiments.

It should be noted that the foregoing computer-readable medium described in the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM or flash memory), an optic fiber, a portable compact disk read-only memory (CD-ROM), an optical storage device, a magnetic storage device, or any suitable combination thereof. In the present disclosure, the computer-readable storage medium may be any tangible medium containing or storing a program, and the program may be used by or in combination with an instruction execution system, apparatus, or device. In the present disclosure, the computer-readable signal medium may include a data signal propagated in a baseband or as a part of a carrier, where the data signal carries computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), and the like, or any suitable combination thereof.

In some implementations, a client and a server may communicate by using any currently known or future-developed network protocol such as a hypertext transfer protocol (HTTP), and may be connected to digital data communication (for example, a communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The foregoing computer-readable medium may be contained in the foregoing electronic device. Alternatively, the computer-readable medium may exist independently, without being assembled into the electronic device.

The foregoing computer-readable medium carries one or more programs, and when the one or more programs are executed by the electronic device, the electronic device is enabled to execute the foregoing method.

The computer program code for performing the operations in the present disclosure may be written in one or more programming languages or a combination thereof, where the programming languages include but are not limited to an object-oriented programming language such as Java, Smalltalk, and C++, and further include conventional procedural programming languages such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the case involving the remote computer, the remote computer may be connected to the computer of the user through any type of network, including a local area network (LAN) or a wide area network (WAN), or may be connected to an external computer (for example, connected through the Internet by using an Internet service provider).

The flowcharts and block diagrams in the accompanying drawings illustrate the possibly implemented architecture, functions, and operations of the system, method, and computer program product according to various embodiments of the present disclosure. In this regard, each block in a flowchart or a block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession may actually be performed substantially in parallel, or they may sometimes be performed in a reverse order, depending on a function involved. It should also be noted that each block in a block diagram and/or a flowchart, and a combination of the blocks in the block diagram and/or the flowchart may be implemented by a dedicated hardware-based system that executes specified functions or operations, or may be implemented by a combination of dedicated hardware and computer instructions.

The units described in the embodiments of the present disclosure may be implemented by means of software, or may be implemented by means of hardware. The name of a unit/a module does not constitute a limitation on the unit/a module in some cases, for example, a voice data acquisition module may also be described as a "data acquisition module".

The functions described hereinabove may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system on chip (SOC), a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination thereof. A more specific example of the machine-readable storage medium may include an electrical connection based on one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. This embodiment of the present disclosure provides a computer program product, which, when running on a computer, causes the computer to perform the data migration method according to any one of the foregoing method embodiments.

Persons skilled in the art may easily figure out other implementation solutions of the present disclosure after considering the specification and practicing the invention disclosed herein. The present disclosure is intended to cover any variations, uses, or adaptive changes of the present disclosure. These variations, uses, or adaptive changes follow the general principles of the present disclosure and include common knowledge or conventional technical means in the art that is not disclosed in the present disclosure. The specification and embodiments are merely considered as examples, and the true scope and spirit of the present disclosure are defined by the following claims.

It should be understood that the present disclosure is not limited to the precise structures that have been described above and shown in the accompanying drawings, and various modifications and changes may be made without departing from the scope thereof. The scope of the present disclosure is defined only by the appended claims.

The foregoing descriptions are merely preferred embodiments of the present disclosure, but are not intended to limit the present disclosure. Any modification, equivalent replacement, or improvement made without departing from the spirit and principle of the present disclosure shall fall within the protection scope of the present disclosure.

The invention claimed is:

1. A data migration method, comprising:
obtaining a hot and cold state of a data table to be processed, wherein the hot and cold state of the data table to be processed indicates that data in the data table to be processed is cold data or hot data;
in response to the hot and cold state indicating that the data in the data table to be processed is cold data, determining whether the data table to be processed is associated with a data lock, wherein the data table to be processed being associated with the data lock indicates that a data query task that needs to query the data table to be processed exists, and the data table to be processed not being associated with the data lock indicates that the data query task that needs to query the data table to be processed does not exist; and
in response to the data table to be processed being associated with the data lock, performing a migration operation on the data table to be processed after the data lock is released, so as to migrate the data in the data table to be processed to an archive file system, wherein the data lock being released indicates that execution of the data query task that needs to query the data table to be processed is completed, wherein
the obtaining a hot and cold state of a data table to be processed, comprises:
determining the hot and cold state of the data table to be processed based on a heat cycle of the data table to be processed, wherein the heat cycle indicates a duration for which the data in the data table to be processed is the hot data, and the heat cycle is preconfigured by using a configuration file,
the data table to be processed being associated with the data lock comprises the data table to be processed being locked entirely, and
performing the migration operation on the data table to be processed after the data lock is released comprises:
performing the migration operation on all data included in the data table to be processed after the data lock is released.

2. The method according to claim 1, wherein the data table to be processed being associated with the data lock, comprises:
a first partition in the data table to be processed being locked, wherein the data table to be processed comprises at least one partition, the at least one partition comprises the first partition, and the first partition is a partition that needs to be queried by the data query task; and
performing the migration operation on the data table to be processed after the data lock is released comprises:
performing the migration operation on data included in the first partition after the data lock is released.

3. The method according to claim 2, wherein the at least one partition further comprises a second partition, the second partition is a partition that does not need to be queried by the data query task, and the method further comprises:

in response to the first partition being locked, immediately performing the migration operation on data included in the second partition.

4. The method according to claim 1, further comprising:
in response to the data table to be processed not being associated with the data lock, performing immediately the migration operation on the data table to be processed.

5. The method according to claim 1, wherein the data table to be processed comprises:
a data table in a data warehouse analysis system that is constructed based on distributed computing.

6. An electronic device, comprising a processor and a memory,
wherein the processor is configured to execute instructions stored in the memory, to cause the electronic device to perform a data migration method, and the data migration method comprises:
obtaining a hot and cold state of a data table to be processed, wherein the hot and cold state of the data table to be processed indicates that data in the data table to be processed is cold data or hot data;
in response to the hot and cold state indicating that the data in the data table to be processed is cold data, determining whether the data table to be processed is associated with a data lock, wherein the data table to be processed being associated with the data lock indicates that a data query task that needs to query the data table to be processed exists, and the data table to be processed not being associated with the data lock indicates that the data query task that needs to query the data table to be processed does not exist; and
in response to the data table to be processed being associated with the data lock, performing a migration operation on the data table to be processed after the data lock is released, so as to migrate the data in the data table to be processed to an archive file system, wherein the data lock being released indicates that execution of the data query task that needs to query the data table to be processed is completed, wherein
the obtaining a hot and cold state of a data table to be processed, comprises:
determining the hot and cold state of the data table to be processed based on a heat cycle of the data table to be processed, wherein the heat cycle indicates a duration for which the data in the data table to be processed is the hot data, and the heat cycle is preconfigured by using a configuration file,
the data table to be processed being associated with the data lock comprises the data table to be processed being locked entirely, and
performing the migration operation on the data table to be processed after the data lock is released comprises:
performing the migration operation on all data included in the data table to be processed after the data lock is released.

7. The electronic device according to claim 6, wherein the data table to be processed being associated with the data lock, comprises:
a first partition in the data table to be processed being locked, wherein the data table to be processed comprises at least one partition, the at least one partition comprises the first partition, and the first partition is a partition that needs to be queried by the data query task; and
performing the migration operation on the data table to be processed after the data lock is released comprises:
performing the migration operation on data included in the first partition after the data lock is released.

8. The electronic device according to claim 7, wherein the at least one partition further comprises a second partition, the second partition is a partition that does not need to be queried by the data query task, and the data migration method further comprises:
in response to the first partition being locked, immediately performing the migration operation on data included in the second partition.

9. The electronic device according to claim 6, wherein the data migration method further comprises:
in response to the data table to be processed not being associated with the data lock, performing immediately the migration operation on the data table to be processed.

10. The electronic device according to claim 6, wherein the data table to be processed comprises:
a data table in a data warehouse analysis system that is constructed based on distributed computing.

11. A non-transitory computer-readable storage medium, comprising instructions,
wherein the instructions instruct a device to perform a data migration method, and the data migration method comprises:
obtaining a hot and cold state of a data table to be processed, wherein the hot and cold state of the data table to be processed indicates that data in the data table to be processed is cold data or hot data;
in response to the hot and cold state indicating that the data in the data table to be processed is cold data, determining whether the data table to be processed is associated with a data lock, wherein the data table to be processed being associated with the data lock indicates that a data query task that needs to query the data table to be processed exists, and the data table to be processed not being associated with the data lock indicates that the data query task that needs to query the data table to be processed does not exist; and
in response to the data table to be processed being associated with the data lock, performing a migration operation on the data table to be processed after the data lock is released, so as to migrate the data in the data table to be processed to an archive file system, wherein the data lock being released indicates that execution of the data query task that needs to query the data table to be processed is completed, wherein
the obtaining a hot and cold state of a data table to be processed, comprises:
determining the hot and cold state of the data table to be processed based on a heat cycle of the data table to be processed, wherein the heat cycle indicates a duration for which the data in the data table to be processed is the hot data, and the heat cycle is preconfigured by using a configuration file,
the data table to be processed being associated with the data lock comprises the data table to be processed being locked entirely, and
performing the migration operation on the data table to be processed after the data lock is released comprises:
performing the migration operation on all data included in the data table to be processed after the data lock is released.

12. The non-transitory computer-readable storage medium according to claim 11, wherein the data table to be processed being associated with the data lock, comprises:

a first partition in the data table to be processed being locked, wherein the data table to be processed comprises at least one partition, the at least one partition comprises the first partition, and the first partition is a partition that needs to be queried by the data query task; and performing the migration operation on the data table to be processed after the data lock is released comprises:
performing the migration operation on data included in the first partition after the data lock is released.

13. The non-transitory computer-readable storage medium according to claim 12, wherein the at least one partition further comprises a second partition, the second partition is a partition that does not need to be queried by the data query task, and the data migration method further comprises:
in response to the first partition being locked, immediately performing the migration operation on data included in the second partition.

* * * * *